Aug. 23, 1966 T. J. PRICENSKI 3,268,064
REFRACTORY METAL CONVEYOR BELT
Filed Dec. 31, 1963

THEODORE J. PRICENSKI
INVENTOR
BY
ATTORNEY

United States Patent Office 3,268,064
Patented August 23, 1966

3,268,064
REFRACTORY METAL CONVEYOR BELT
Theodore J. Pricenski, Ipswich, Mass., assignor to Sylvania Electric Products Inc., a corporation of Delaware
Filed Dec. 31, 1963, Ser. No. 334,777
13 Claims. (Cl. 198—193)

This invention relates to refractory metal conveyor belts for high temperature furnaces having operating capabilities as high as 3000° C.

Refractory metals have been used for many high temperature applications and conveyor belts have been made of a variety of metals. The refractory metal which is mainly used for such applications is tungsten although sometimes molybdenum, columbium, rhenium and tantalum have applicability. Notably, however, the refractory metals have not been used for commercially available conveyor belts because of the difficulty of working with them. They cannot be easily shaped into wire forms and after heating them become very brittle. Hence even with the advantage that they may be effectively used as conveyor belts in high temperature furnaces, they have not been manufactured.

I have discovered a belt construction which can be made fairly easily and has withstood prolonged use at high temperatures with a minimum of maintenance. According to my invention, the conveyor belt is formed of an interdigitated series of belt sections, each of the sections being made of a group of links mounted upon a connector. The links are formed of an elongated shank with a pair of incurved prolongations extending from either end thereof. Each of the distal ends of the prolongations can be disposed toward the shank. Preferably the connectors are formed of substantially irresilient, helical windings of the refractory metal, the convolutions being substantially circular in cross-section and having a pitch of 100%, the exterior surfaces of the windings forming a thread. At each end of the connectors, I place abutments which can be helical convolutions of the refractory metal screwed upon the threads. When desired, the abutment can be secured to the connector by welding or cross-threading.

Accordingly, the primary object of my invention is the use of refractory metals for conveyor belts.

And another object of my invention is the fabrication of conveyor belt structures of refractory metals which can be used in furnaces adapted to be heated as high as 3000° C.

The many other objects, features and advantages of my invention will become apparent to those conversant with the art upon reading the following specification when taken in conjunction with the accompanying drawings wherein specific embodiments of my conveyor belt are shown and described by way of illustrative examples.

Of these drawings:

FIGURE 4 is partially cut away to expose the manner of backing the abutment onto the connector.

Figure 1:
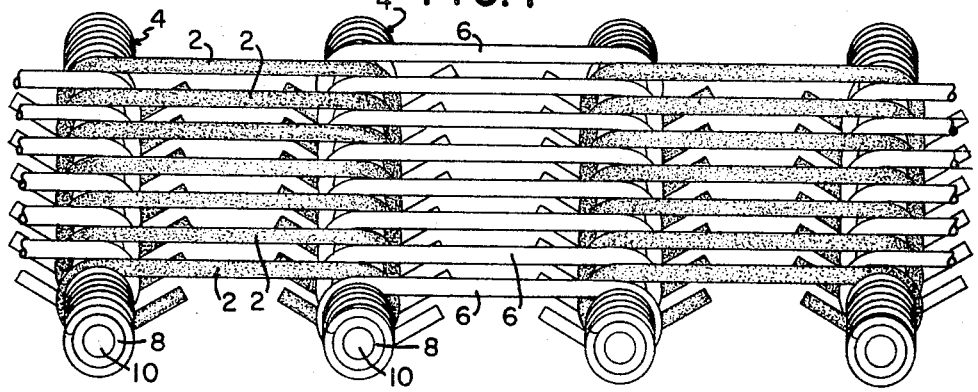
FIGURE 1 is a perspective view of a portion of the assembled conveyor belt.

Referring now to FIGURE 1, my conveyor belt is formed of an interdigitated series of individual refractory metal belt sections. Preferably one of the sections has an odd number of links 2 and the adjacent section has an even number of links 6. A connector 4 is used to join the link sections together.

Each of the links is formed of a shank with incurved prolongations disposed at either end thereof for positioning about a connector. Each of the connectors 8 is preferably formed of substantially irresilient windings of a refractory metal wire, the pitch of the winding being 100%, that is, the turns are touching. When forming the connector, the wire is wrapped upon a mandril 10 which is preferably left in the winding to enhance its strength. Screwed upon the ends of the connectors 8 are abutments which retain links 2 and 6 in their respective interdigital positions. The use of the connectors such as described allows the links to freely pivot about them and turn when the belt passes around a driver.

Figure 2:
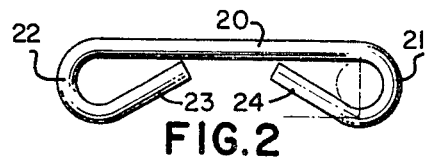
FIGURES 2 and 3 are an elevational view of different shapes of link which can be used to form the conveyor belt.
Figure 3:
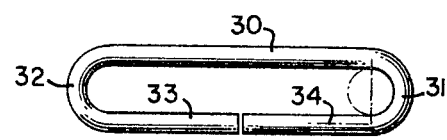

Referring now to FIGURES 2 and 3 of the drawings, the links which I prefer to use in the belt are shown. In FIGURE 2, the links comprise a shank portion 20 with incurved prolongations 21 and 22 disposed at each end. The distal ends 23 and 24 of the incurved prolongations are bent towards the shank 20 at an angle less than about 90° with respect to a perpendicular dropped therefrom to form two loops. As is shown in FIGURE 3, the angle formed by the distal ends 33 and 34 may be exactly to 90° thereby forming an oval link. When such shapes are desired, a shank 30 similar to shank 20 of FIGURE 2 is formed with incurved sections 31 and 32. Either shaped link can be formed into a belt with equal facility.

Frequently it is desired to use loop-ended links at either side of the belt with the oval links in the middle. Such arrangements insure that the links will not slip off the connector while the belt is being driven and also provide a two sided, flat surface.

Figure 4:
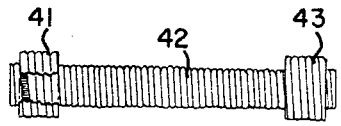
FIGURES 4 and 5 are elevational views of different forms of connectors and abutments which can be used to join the links and conveyor belt sections together.
Figure 5:
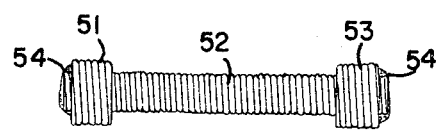

FIGURES 4 and 5 show two different manners of securing the abutments to the connectors. In FIGURE 4, the abutment 43 is screwed upon the exterior screw-surfaces of one end of the connector 42. Links such as shown in FIGURES 2 and/or 3 are interdigitally placed upon the connectors and abutment 41 screwed on the other end. The last turn of the connector is then stretched from the rest of the turns of the connector and the abutment screwed back upon the thread to lock it. If desired and necessary, the abutment 43 can be similarly locked. Another modification of the connector is shown in FIGURE 5 wherein the abutment 53 is screwed upon connector 53 and the links interdigitally placed thereon. The abutment 51 can then be screwed upon the connector and welded on with flux 54 disposed to prevent movement.

Figure 6:
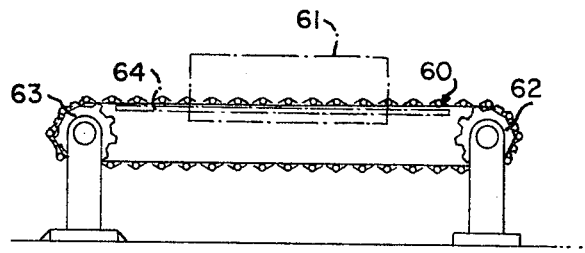
FIGURE 6 is an schematic view showing the conveyor belt disposed upon sprockets and driven through a furnace.

FIGURE 6 shows the disposition of the conveyor belt 60 in a furnace 61. The belt 60 generally having greater than three belt sections is mounted upon drivers 62 and 63, the drivers having cogs which fit about the abutments attached to the connectors. Preferably the shanks of the links are disposed so that they rest upon the furnace upon the furnace floor 64 so that maximum support for the belt is attained. However the distal ends of the links may be placed upon the floor 64 especially if they are oval shape as shown in FIGURE 3.

It is apparent that modifications and changes may be made within the spirit and scope of the instant invention, but it is my intention, however, only to be limited by the spirit and scope of the instant claims.

As my invention I claim:

1. A refractory metal conveyor belt section comprising: a connector with an abutment disposed at either end thereof; said connector being formed of a substantially irresilient helical convolution of refractory metal wire, the outer surfaces of said convolution forming a thread; a plurality of links disposed about said connector, said links comprising an elongated shank; an incurved prolongation disposed at either end of said shank; the distal ends of said prolongation being bent toward said shank at an angle not more than about 90° with respect to a perpendicular dropped from said shank.

2. The belt section according to claim 1 wherein the distal ends of said link are bent to form an oval shape.

3. The belt section according to claim 1 wherein the distal ends of said link are bent to form two loops with the incurved prolongations.

4. The belt section according to claim 1 wherein the abutments are a helical convolution of refractory metal wires screwed on to the connectors.

5. The belt section according to claim 4 wherein the abutments are secured to the connector by welding.

6. The belt section according to claim 4 wherein the abutments are secured to the connector by cross threading.

7. A conveyor belt comprising: at least three conveyor belt sections, said belt sections each comprising a connector with an abutment disposed at either end thereof, said connectors being formed of a substantially irresilient helical convolutions of refractory metal wire, the outer surfaces of said convolution forming a thread; a plurality of links disposed about each of said connectors, said links comprising an elongated shank, an incurved prolongation disposed at either end of said shank, the distal ends of said prolongations being bent towards said shank at an angle not more than about 90° with respect to a perpendicular dropped from said shank, the links of one belt section being interdigitally arranged on the connector of an adjacent belt section with the link of said belt section.

8. The belt according to claim 7 wherein there are alternatively an even number of links in one belt section and an odd number in each adjacent belt section.

9. The conveyor belt according to claim 7 wherein the distal ends of said link are bent to form an oval shape.

10. The conveyor belt according to claim 7 wherein the distal ends of said link are bent to form two loops with the incurved prolongations.

11. The conveyor belt according to claim 7 wherein the abutments are helical convolutions of refractory metal wires screwed on the connectors.

12. The conveyor belt according to claim 11 wherein the abutments are secured to the connector by welding.

13. The conveyor belt according to claim 11 wherein the abutments are secured to the connector by cross threading.

References Cited by the Examiner

UNITED STATES PATENTS

| 725,686 | 4/1903 | Egan | 198—193 X |
| 1,022,929 | 4/1912 | Coulston | 198—193 |
| 2,986,387 | 6/1961 | Illing | 198—193 X |

FOREIGN PATENTS 43,430  11/1926  Norway.

EVON C. BLUNK, *Primary Examiner.*

EDWARD A. SROKA, SAMUEL F. COLEMAN,
*Examiners.*